United States Patent [19]
Vanderheyden et al.

[11] Patent Number: 6,078,481
[45] Date of Patent: Jun. 20, 2000

[54] TAPE STORAGE CARTRIDGE HAVING TWO-LEVEL TAPE PATH

[75] Inventors: William J. Vanderheyden, River Falls, Wis.; Douglas W. Johnson, Stillwater; Richard W. Molstad, St. Paul, both of Minn.

[73] Assignee: Imation Corp., Oakdale, Minn.

[21] Appl. No.: 09/093,224

[22] Filed: Jun. 8, 1998

[51] Int. Cl.⁷ .............................. G11B 23/02; G11B 5/78
[52] U.S. Cl. ............................................ 360/132; 360/134
[58] Field of Search ..................................... 360/132, 134

[56] References Cited

U.S. PATENT DOCUMENTS

| | | |
|---|---|---|
| 2,679,394 | 5/1954 | Lear . |
| 3,004,728 | 10/1961 | Ihle . |
| 3,175,780 | 3/1965 | Nettles . |
| 3,333,753 | 8/1967 | Streets . |
| 3,340,369 | 9/1967 | Seidl . |
| 3,558,142 | 1/1971 | Poessel ..................................... 434/308 |
| 3,640,479 | 2/1972 | Hata ..................................... 242/326.3 |
| 3,707,608 | 12/1972 | Sugaya et al. ............................. 360/17 |
| 3,806,574 | 4/1974 | Arvidson, Jr. . |
| 3,860,957 | 1/1975 | Imanishi et al. ........................... 360/17 |
| 3,912,144 | 10/1975 | Arseneault et al. . |
| 4,000,519 | 12/1976 | Turk ........................................ 360/132 |
| 4,104,686 | 8/1978 | Hashimoto ........................... 242/326.2 |
| 4,139,168 | 2/1979 | Alberding ............................. 242/346.2 |
| 4,182,472 | 1/1980 | Peekna . |
| 4,389,600 | 6/1983 | Milligan et al. . |
| 4,406,906 | 9/1983 | Meyer et al. . |
| 4,456,160 | 6/1984 | Schoettle et al. . |
| 4,576,876 | 3/1986 | Shiiki et al. ............................. 428/679 |
| 5,210,670 | 5/1993 | Tanaka et al. ........................ 242/338.3 |
| 5,284,308 | 2/1994 | Comeaux et al. . |
| 5,293,285 | 3/1994 | Leonhardt et al. ........................ 360/95 |
| 5,297,755 | 3/1994 | Felde et al. . |
| 5,547,142 | 8/1996 | Cheatham et al. . |
| 5,850,328 | 12/1998 | Leonhardt et al. ...................... 360/134 |

FOREIGN PATENT DOCUMENTS 2 140 778A  12/1984  United Kingdom .

*Primary Examiner*—William Klimowicz
*Attorney, Agent, or Firm*—Eric D. Levinson

[57] ABSTRACT

A tape cartridge includes a first rotatable hub and a second rotatable hub and a tape head receiving region. A flexible recording tape is wound upon the first rotatable hub and the second rotatable hub. The flexible recording tape is routed through the cartridge to provide two levels or layers of tape at the tape head receiving region. The tape path may include a flexible tape routed through the cartridge to provide two levels of tape at least one of the tape guides or tape pins within the tape cartridge. Of course the tape path through the tape cartridge may also include the tape head. At startup the tape always driven in the same direction so that the layer of tape underneath the other layer of tape is initially placed in tension. This prevents binding of one layer with respect to the second layer at startup. If the initial startup direction is opposite from the desired direction, the direction of the tape is reversed within the tape cartridge. A tape for use in a tape drive including a double loop type tape path includes a substrate having a magnetic layer applied to one side of the substrate, and having a backside of soft magnetic material applied to the other side of the substrate. The backside acts as a magnetic shield to prevent writing though the layer of tape nearest the head to the layer of tape underneath the layer of tape being written to.

21 Claims, 8 Drawing Sheets

TAPE STORAGE CARTRIDGE HAVING TWO-LEVEL TAPE PATH

FIELD OF THE INVENTION

The invention relates to a high performance tape cartridge. More particularly, the invention is directed toward a tape path within a tape cartridge that allows high head/tape interface pressure and low tape tension.

BACKGROUND OF THE INVENTION

Tape is a known medium or media for the storage of audio, video, and computer information. The information is typically written to and read from the tape magnetically and/or optically. Such tapes are available spooled on individual reels and in single or dual reel tape cassettes/cartridges. The tape in a single reel tape cartridge must be mechanically threaded through the tape path and spooled onto a take-up reel after insertion into a tape device/drive. The tape path for any type of tape cartridge and tape drive includes a tape head in close proximity to the tape. Tape cartridges include an opening through which a tape head from a tape drive is inserted. The tape head has one or more transducer elements for writing to and/or reading from the tape. The tape is driven past the tape head by a capstan, or by direct drive of the tape reels. In current tape cartridges, the tape on the tape path passes the opening for the tape head one time. In other words, one layer or level of tape is presented at the tape head opening when the tape cartridge is inserted into the tape drive. As used herein, the terms "cassette" and "cartridge", and the terms "device" and "drive" are interchangeable.

Cassettes or cartridges including tape are commonly used to back up computer information from all types of computer systems. This is especially common in work environments where the information may be backed up daily. Home computers also may be equipped with tape drives which use tape cartridges to back up computer information. An additional usage for tape and tape cartridges is for the storage of vast amounts of data. In some instances one or more tape cartridges may be used in a library which includes a tape drive coupled with a picking mechanism and a storage area storing a number of tape cartridges accessible by the picking mechanism. The picking mechanism picks the tape cartridges and inserts them into the tape drives when the information on the drive is needed. The picking mechanism removes the tape cartridges from the tape drives and returns them to the storage area when the information is no longer needed.

Magnetic tape drives typically use a reel-to-reel tape transport design, or "tape path", for controllably advancing the tape past an adjacent tape head. The tape is wound upon 2 reels, one reel at each end. The tape is advanced by rotation of such reels. Tension variation and velocity variation in reel-to-reel tape paths can cause many problems in tape drives and tape cartridges. Variations in tape velocity and tension cause vibration. Tape vibration can be characterized according to the propagation velocity of the vibratory mode, the length and geometry of the vibration transmission path, and the terminating conditions of the vibration transmission path. Such vibration in the tape can disrupt the head-tape interface, and thus effects the overall operation and performance of the drive.

Another problem with tape occurs when the tape quickly moves substantially transverse to the tape winding direction. Such movements may have any number of causes but the most common causes appear to be when a hub moves with respect to the base, when the axis of rotation is not coaxial with the hub, and when stagger lined tape is unwound from a hub. Each of these events accelerates the tape in a direction transverse to its travel. The acceleration typically travels down the length of the tape much like when someone quickly moves a long rope up and down. Tape transports are now being provided with track following heads which move to follow the tracks as the tape passes the head. However, when a hub moves and accelerates the tape, the head typically can not be moved fast enough to accommodate a short quick acceleration.

As previously mentioned, many tape cartridges include an opening for the tape head. In current tape cartridges the tape on the tape path passes the opening one time so that one layer or level of tape is presented to the tape head when it is inserted in the opening of the cartridge and is in a transducing position. There is a constant goal to produce a tape cartridge capable of storing more data in a tape cartridge having the same size. One way of increasing the data capacity of a tape cartridge is to place more tape into a tape cartridge. As a result, tapes continually are made from thinner material so that more feet of tape can be wound onto the hubs in a tape cartridge. Handling thinner and thinner tape or media is one of the major problems faced by designers of tape cartridges and tape drives. Tape tension generally must be reduced when a thinner tape is used to avoid certain problems such as over stressing and other damage. With lower tape tension, the tape flies higher with respect to the head at the head/tape interface. The farther the head is from the media the poorer the transitions on the media are. As a result, higher flying tape results in signals having reduced quality.

If higher tensions are maintained on the thinner tape to keep the flying height of the tape lower thereby maintaining good signal quality, tape creep and telescoping of the tape may occur. Telescoping is a phenomenon that occurs when a tape having one longer edge is wound onto a hub. The longer edge is typically ruffled. When winding such a tape onto a hub the longer edge stays at a longer radius and the shorter edge goes to a shorter radius. The end result is that the tape tends spiral toward one of the edges of the hub while it is being wound. The tendency to telescope can result in deformation of the sidewall of a hub.

In many instances, felt pressure pads are provided near the opening in the tape head to control the pressure between the tape and the tape head. Felt pressure control pads have a number of problems. Among the problems include threading the tape in a cartridge having the felt pressure pads. Another problem is that the felt pressure pads generate debris over their life. Still another problem is that as they wear the pressure may change and they also collect debris. During manufacture, there is also control issues with respect to the size and placement of the felt pressure pads.

What is needed is a tape cartridge that uses low tension to accommodate the use of thinner tape. There is also a need for a tape cartridge that does not require felt pressure pads to maintain an adequate tape pressure at the head/tape interface to keep the flying height of the tape low so that good signal quality is maintained. What is also needed is a tape path which dampens out accelerations of the tape in the vertical direction so that a head which track follows will be better able to follow the tracks on the tape.

SUMMARY OF THE INVENTION

A tape cartridge includes a first rotatable hub and a second rotatable hub and a tape head receiving region. A flexible recording tape is wound upon the first rotatable hub and the second rotatable hub. The flexible recording tape is routed through the cartridge to provide two or more levels or layers of tape at the tape head receiving region. The tape cartridge may also have a single hub and may include a tape path through the cartridge to provide two or more levels or layers of tape at the tape head receiving region. Tape guides and pins may also be included in the tape cartridge. The tape path may include a flexible tape routed through the cartridge to provide two or more levels of tape at one or more of the tape guides or tape pins within the tape cartridge. Of course the tape path through the tape cartridge may also include the tape head.

Advantageously, forming a tape path having two or more layers formed at the tape head receiving region of the tape cartridge allows the tape head to contact the tape at a high pressure for a given lower tape tension for a given head and tape interface. In other words, if two or more layers of tape are presented at the tape head, the contact pressure across or over the head can be higher than when a single layer of tape is presented to the tape head. When thinner tape is used, the tension can be lowered to side step many of the ill effects of over stressing the tape. The pressure at the tape head can be kept at a level where the tape will fly at a height to produce good signals when writing to or reading from the tape, despite the fact that a lower tape tension is used. Using lower tension also requires less torque for the drive motor of the tape drive. In addition, lower tension lowers the load on the tape guides and tape pins which do not carry multiple layers of tape. Edge loading on the tape is also reduced in tape drives and tape cartridges with compliant or spring loaded tape guides since the load is being shared by two or more or more layers of tape. This helps reduce tape edge damage, distortion, rippling and debris generation. Lower tension also reduces tape telescoping and also reduces tape creep by lowering stressing in the stored tape.

Other advantages stem from the fact that the length of the tape path is longer. By increasing the effective tape path length, and providing layer to layer damping, the closed loop track following servo performance is enhanced. Improved servo performance improves tape tracking. Improved tape tracking enables higher track densities on the tape. Yet another advantage is that thinner tape can now be used. The increased track densities and thinner tape will allow for larger data capacities for a tape cartridge of a particular form factor.

A tape for use in a tape drive including a double loop type tape path includes a substrate having a magnetic layer applied to one side of the substrate, and having a backside of soft magnetic material applied to the other side of the substrate. The backside may includes particles of magnetite. The backside acts as a magnetic shield to prevent writing though the layer of tape nearest the head to the layer of tape underneath the layer of tape being written to.

BRIEF DESCRIPTION OF THE DRAWINGS

The following detailed description of the preferred embodiments can best be understood when read in conjunction with the following drawings, in which.

DETAILED DESCRIPTION OF THE PREFERRED EMBODIMENT

Figure 1:
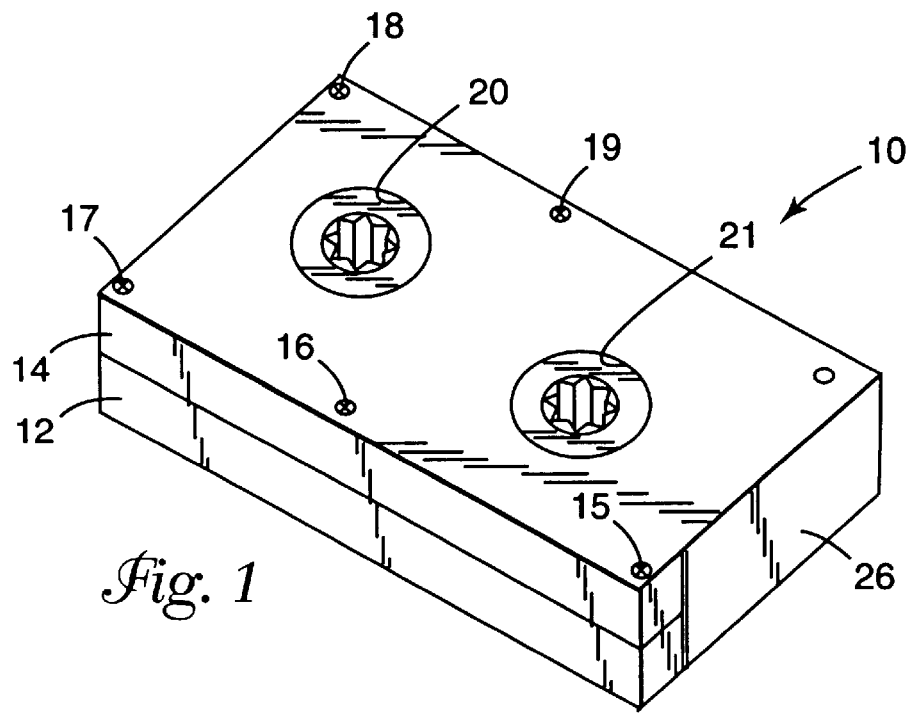
FIG. 1 shows a isometric view of a tape cartridge.

FIG. 1 shows a isometric view of a tape cartridge 10. The tape cartridge 10 is shown as an example of one type of tape cartridge 10 in which the invention could be used. It should be noted that a tape cartridge 10 having any form factor or of any type could use the invention. U.S. Pat. No. 5,547,142 shows one example of a tape cartridge in which the invention could be used. U.S. Pat. No. 5,297,755 shows another example of a tape cartridge in which the invention could be used. The tape cartridge 10 includes a box-like housing formed by a mount plate or base 12 and a cover or shell 14. Shell 14 is secured to base 12 by screws inserted through a set of holes 15–19. Shell 14 also includes two holes 20 and 21 exposing portions of two tape hubs. As shown in FIG. 1, the tape hubs are toothed hub tape reels. A pivoting access door 26 is hinged between base 12 and shell 14 and is shown in the closed position.

Figure 2:
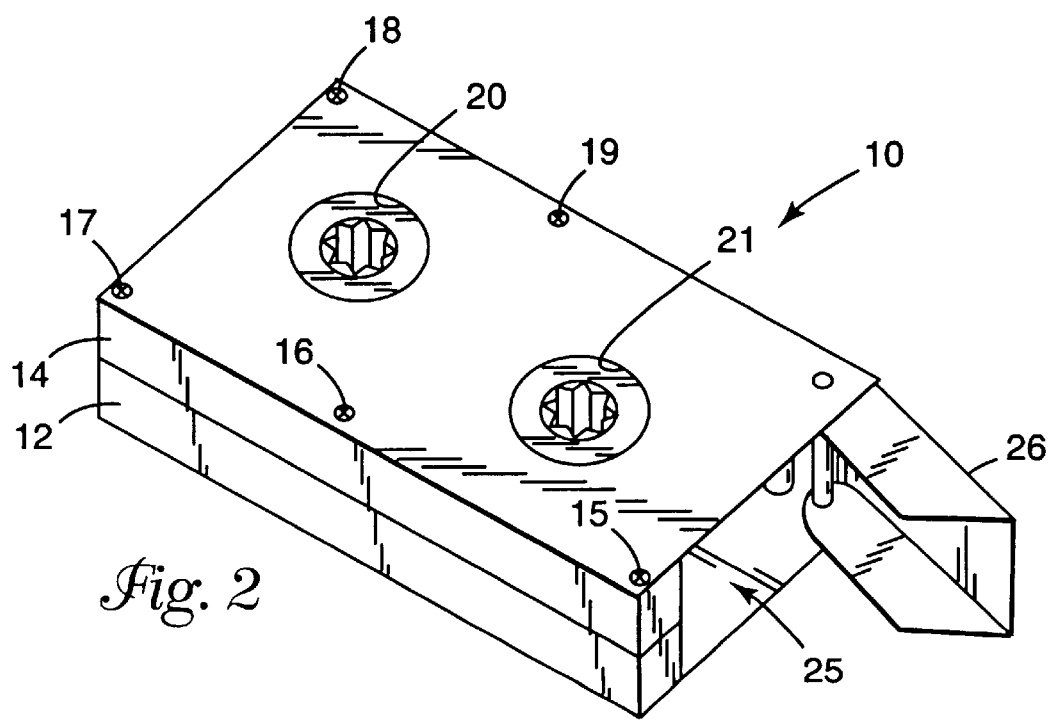
FIG. 2 shows an isometric view of a tape cartridge with the pivoting access door open.

FIG. 2 shows an isometric view of a tape cartridge 10 with the pivoting access door 26 in an open position. Referring to FIG. 2, tape cartridge 10 is shown with access door 26 pivoted to the open position, thereby exposing the inside of tape cartridge 10 through an opening referred to as the tape head receiving region and represented by arrow 25. The tape is not shown in FIG. 2 to permit viewing of the tape head receiving region 25. When access door 26 is pivoted to the open position, one or more tape heads (not shown) may be brought into contact with the tape to permit read and/or write access to data on the tape, as will be described further herein.

Figure 3:
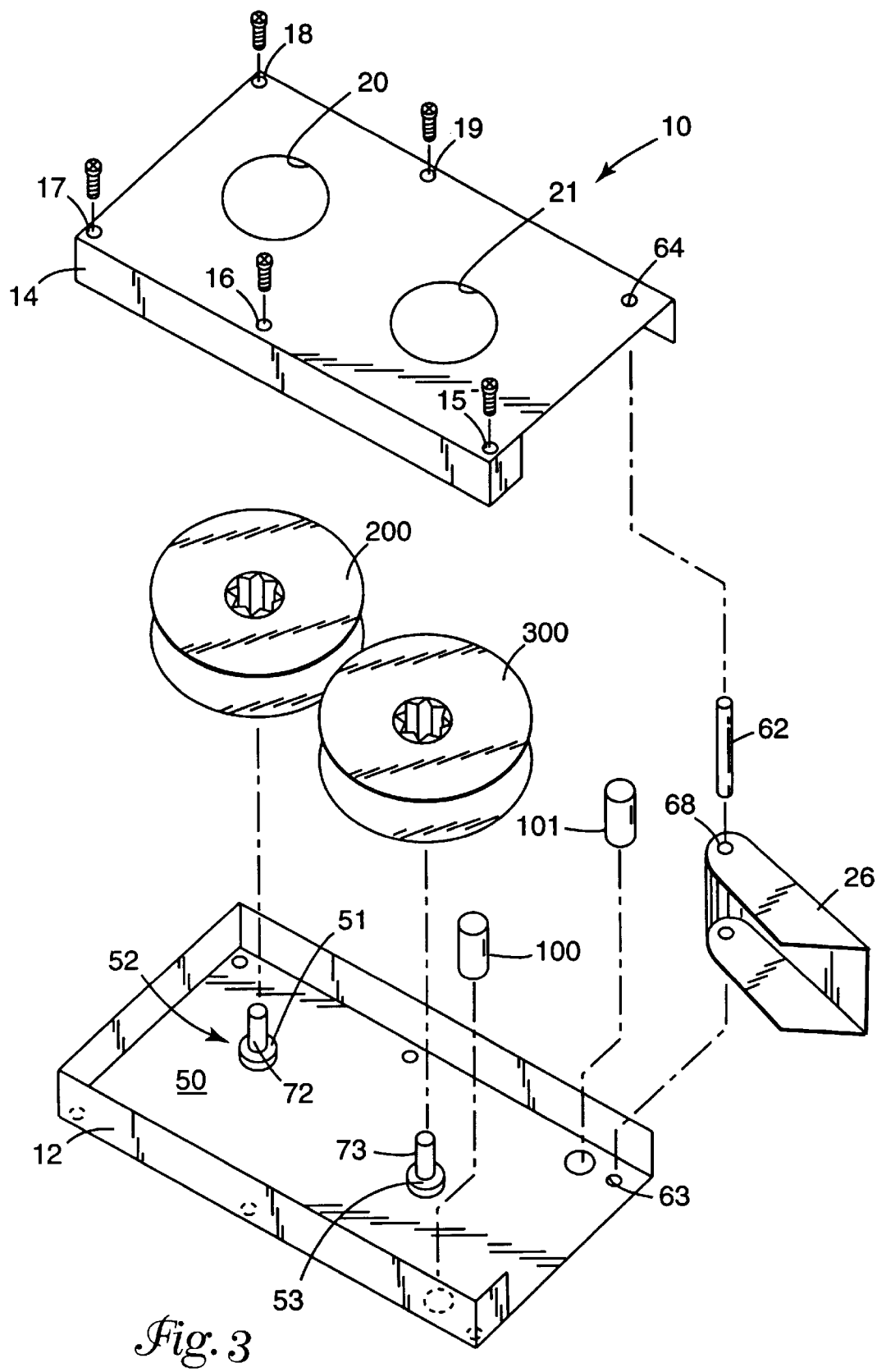
FIG. 3 shows an exploded isometric view of a tape cartridge.

FIG. 3 shows an exploded isometric view of a tape cartridge 10. The tape cartridge 10 is shown exploded to expose the inner portion of the cartridge. For clarity, no tape is shown. Tape paths will be discussed below. A pin 62 secures base 12 at a hole 63 to shell 14 at a hole 64. Pin 62 is inserted through hole 68 to permit pivoting of access door 26.

Base 12 includes various inner surfaces. Base 12 includes a floor or inner surface 50 and a set of inner mount surfaces 51 and 53 which are attached to the floor 50 and are in the same mount plane 52. Because mount surfaces 51 and 53 are in the same mount plane 52, various tape cartridge components can be precisely positioned relative to each other. The inner surface 50 is recessed with respect to the mount plane 52 to permit the unobstructed rotation of the two tape hubs 200 and 300. The two tape hubs 200 and 300 are mounted on the mount surfaces 51 and 53. Two axles 72 and 73 are secured to mount surfaces 52 and 53, respectively. The hubs of two toothed hub tape reels 200 and 300 are rotatably mounted upon hub axles 72 and 73, respectively. Axles 72 and 73 extend through openings in the two hub 200 and 300, respectively. The hubs 200 and 300 rotate on the two axles 72 and 73. Several components of tape cartridge 10 or a tape cartridge mount are mounted to or interface with inner surface 50. A first tape guide pin 100 and a second tape guide pin 101 are secured to mount surface 50.

Figure 4:
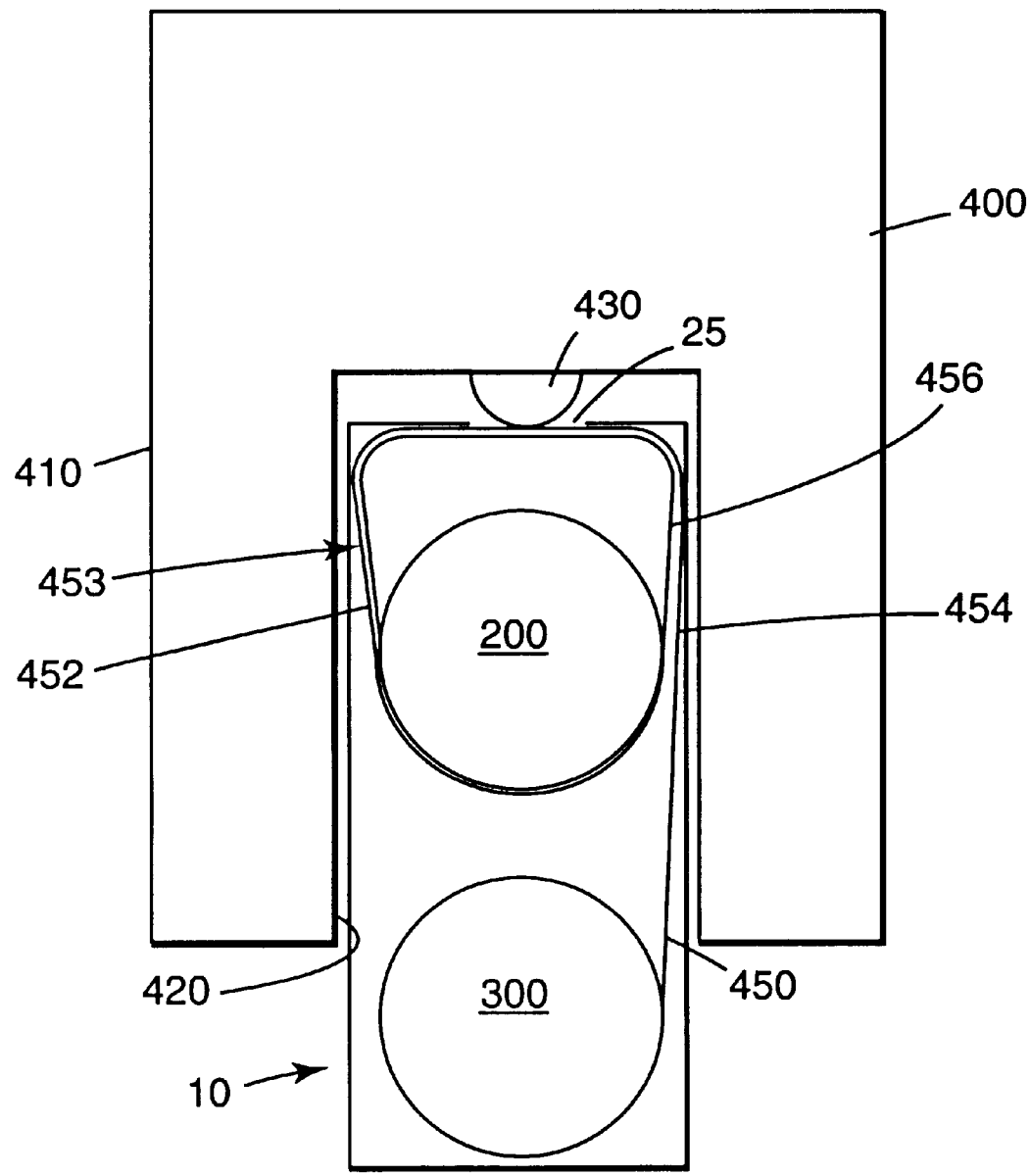
FIG. 4 shows a schematic view of a tape drive and a cartridge.
Figure 5:
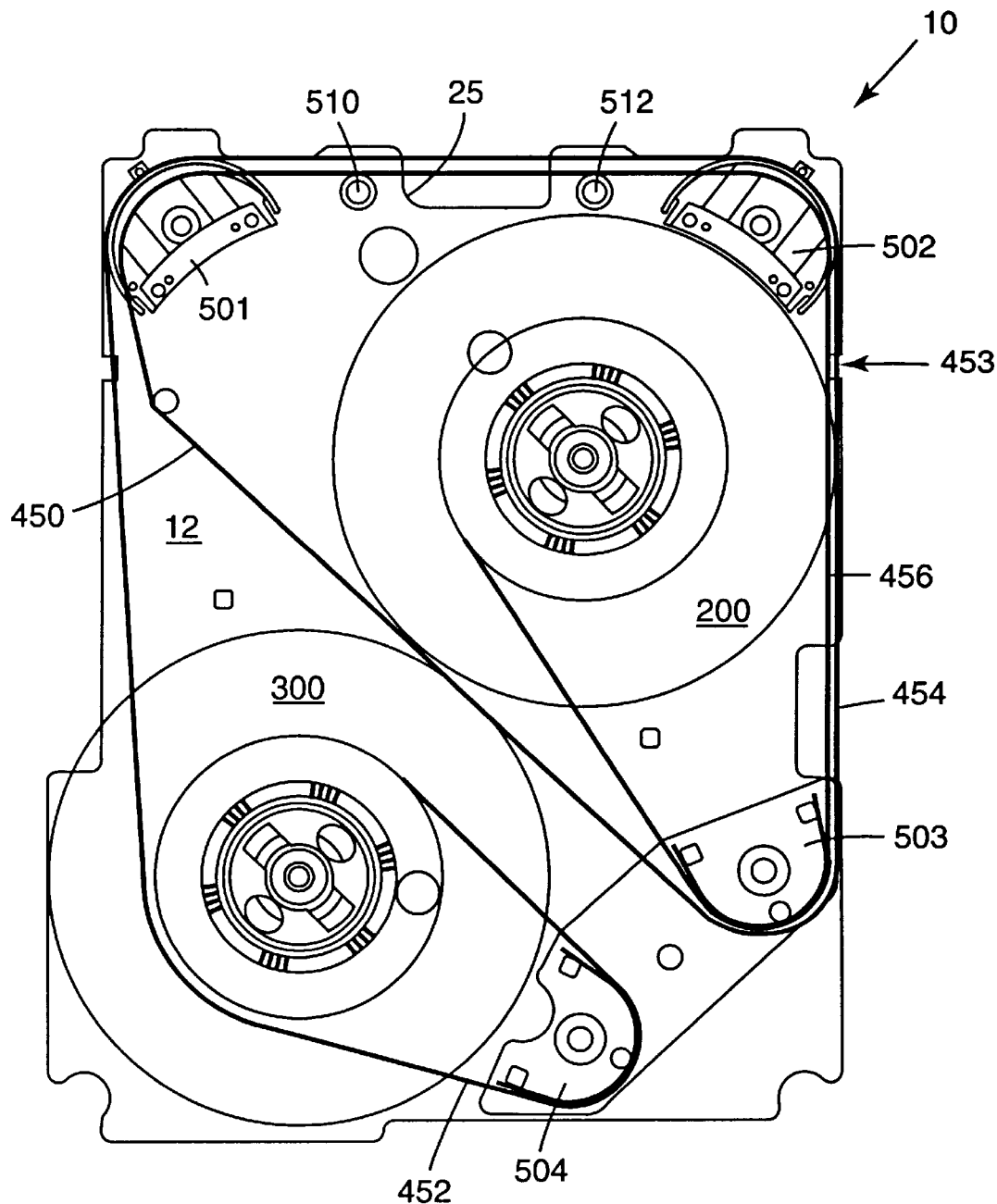
FIG. 5 shows a top view of the base of a tape cartridge and a first magnetic tape path within the tape cartridge.
Figure 6:
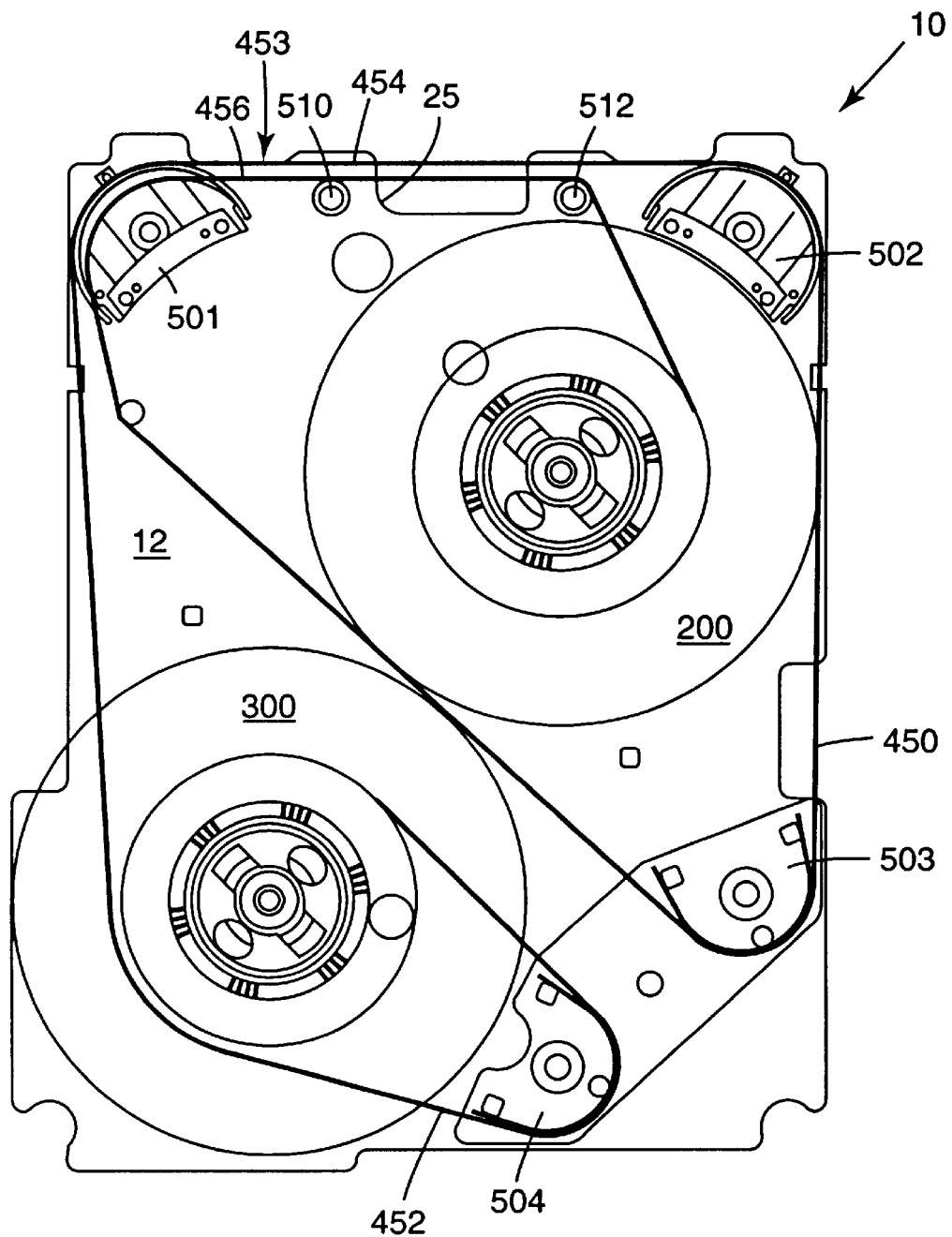
FIG. 6 shows a top view of the base of a tape cartridge and a second magnetic tape path within the tape cartridge.
Figure 7:
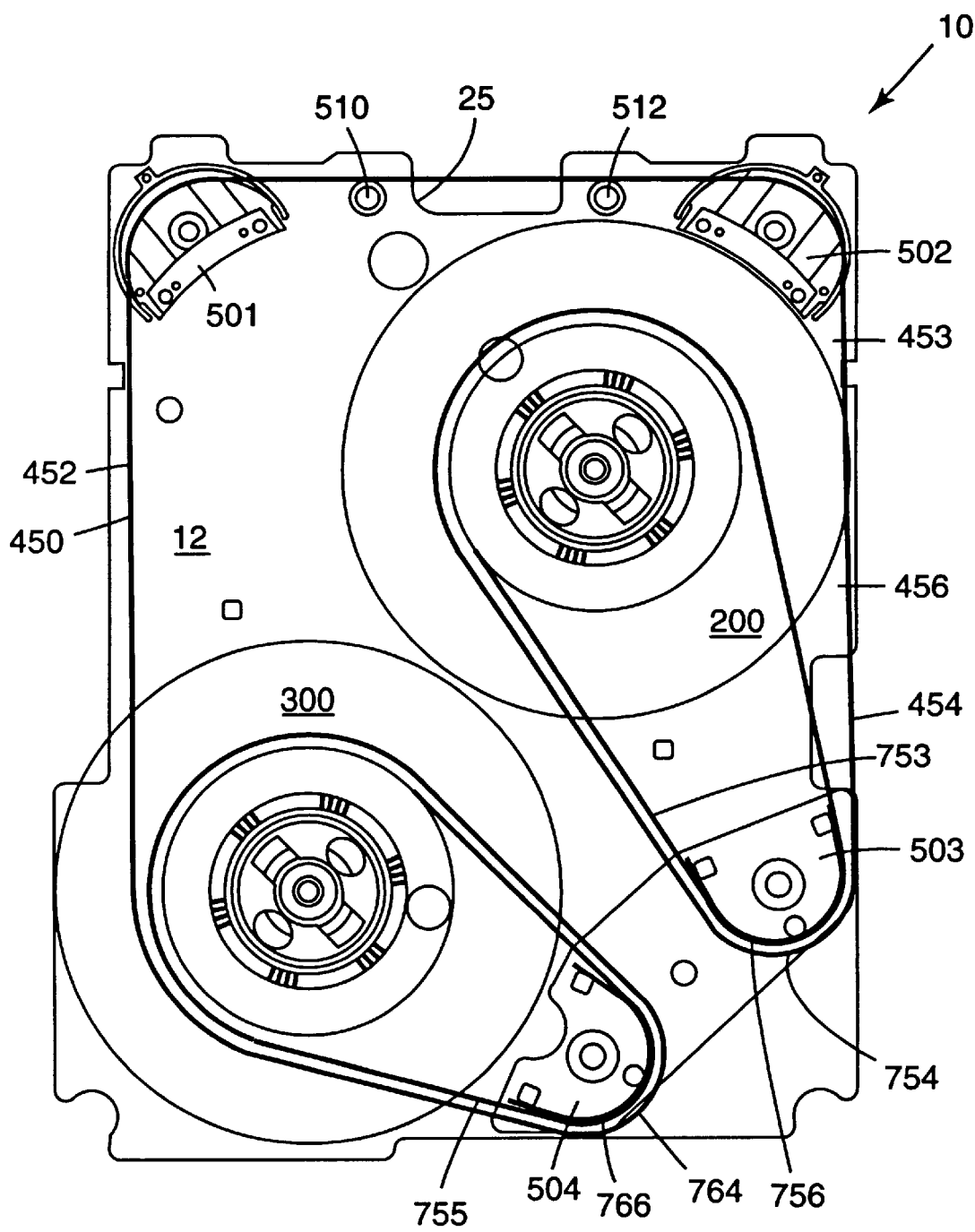
FIG. 7 shows a top view of the base of a tape cartridge and a third magnetic tape path within the tape cartridge.

FIG. 4 shows a schematic view of a tape drive 400 and a tape cartridge 10. The tape drive 400 includes a housing 410 having a recess 420 for receiving the tape cartridge 10. The tape drive 400 also includes a tape head 430 positioned within the recess 420 so that when the tape cartridge 10 is inserted within the recess 420, the tape head 430 is inserted into the head receiving region 25. If the tape cartridge had a door 26 to the head receiving region 25, the door would have to be opened before the tape head 430 could be positioned within the tape head receiving region 25. The tape head 430 includes a number of transducing elements or read write heads (not shown) which are used to write information representing data to a tape 450. The tape 450 is passed over various guides and pins which are shown in FIGS. 5–7 below and past the tape head receiving portion 25 of the tape cartridge. The path which the tape takes over various guides and pins which are shown in FIGS. 5–7 below and past the tape head receiving portion 25 of the tape cartridge 10 is termed the tape path 452.

As shown in FIG. 4, the tape path 452 includes two layers or levels of tape which are passed over the tape head 430. The tape path 452 includes a double loop of tape 453 and presents two layers or levels of tape 450 over the tape head 430. The layer of tape 450 which actually flies over the tape head 430 is referred to as the outer layer 454 of tape 450. The layer of tape that is closest to the hub 200 is referred to as the inner layer 456 of tape 450. The tape is wound onto the hub 200 which is positioned closest to the head receiving portion 25 of the tape cartridge 10 and onto the hub 300. The tape 450 may be moved in either of two directions past the tape receiving portion 25 of the tape cartridge 10. It should be noted that the tape or media is very thin. So thin in fact, that it may be difficult to differentiate between a single layer of tape and two layers of tape 450. In this schematic the thickness of the tape 450 on the tape path 452 has been exaggerated so that the reader can more easily see the tape path 452. The amount of separation between the inner tape 456 has also been exaggerated to show the tape path 452. It should be noted that there is some separation between the inner layer 456 and the outer layer 454 of the tape 450 on the tape path 452 as air bearings are generally formed between the layers. It should be noted that more than two layers of tape could be used. In other words, this invention contemplates using a plurality of layers of tape in a tape path and therefore contemplates using more than two layers of tape in the tape path.

FIG. 5 shows a top view of a base 12 with the shell 14 removed. FIG. 5 shows another tape path 452. The hubs 200 and 300 are shown rotatably attached to the base 12. Also attached to the base are a first tape guide 501, a second tape guide 502, a third tape guide 503, and a fourth tape guide 504. The tape guides 501, 502, 503 and 504 guide the tape 450 along the tape path 452. The tape guides 501, 502, 503 and 504 provide surfaces along which the tape 450 can wrap around to change direction. The amount of direction change is typically defined by an angle θ. Also attached to the base 12 is a first tape pin 510 and a second tape pin 512. The tape pins 510 and 512 typically have smaller radius when compared to the tape guides 501, 502, 503, and 504. The tape pins 510 and 512 also generally change the direction of the tape slightly or over a smaller angle θ when compared to the angle θ associated with the tape guides 501, 502, 503, and 504. As shown, the tape pins 510 and 512 are positioned near the tape head receiving portion 25 of the tape cartridge 10. The tape pins 510 and 512 keep the tape flying over the tape head 430 (shown in FIG. 4) in close proximity to the tape head 430.

In FIG. 5, the tape path 452 begins at the hub 200 and passes over the tape guide 503, the tape guide 502, the tape pin 512, the tape pin 510, and the tape guide 501 and then between the hub 200 and the hub 300. The portion of the tape 450 passing initially over the tape guide 503, the tape guide 502 and the tape guide 501 is the inner layer 456 of tape 450. The tape then passes over the tape guide 503, the tape guide 502 and the tape guide 501 a second time and past the hub 300 to the tape guide 504. The tape is then wound onto the hub 300. The portion of the tape 450 that passes over the tape guide 503, the tape guide 502 and the tape guide 501 the second time is the outside layer 454 of tape 450. In addition, the double looped portion 453 includes the inside layer 456 and the outside layer 454 that passes over the tape guide 503, the tape guide 502 and the tape guide 501. The tape pin 512 and the tape pin 510 are positioned near the tape head receiving opening 25. As mentioned before, the tape pin 512 and the tape pin 510 direct the tape over the tape head 430.

FIG. 6 shows a top view of the base 12 of a tape cartridge 10 and a second magnetic tape path 452 within the tape cartridge 10. In this embodiment, the tape path 452 begins at the hub 200 and passes the tape pin 512, the tape pin 510, and the tape guide 501 and then between the hub 200 and the hub 300. The portion of the tape 450 passing initially over the tape guide the tape pin 512, the tape pin 510, and the tape guide 501 is the inner layer 456 of tape 450. The tape then passes over the tape guide 503, the tape guide 502 and the tape guide 501 a second time and past the hub 300 to the tape guide 504. The tape is then wound onto the hub 300. The portion of the tape 450 that passes over the tape guide the tape pin 512, the tape pin 510, and the tape guide 501 the second time is the outside or outer layer 454 of tape 450. In addition, the double looped portion 453 includes the inside layer 456 and the outside layer 454 that passes the tape guide the tape pin 512, the tape pin 510, and the tape guide 501. The tape pin 512 and the tape pin 510 are positioned near the tape head receiving opening 25. As mentioned before, the tape pin 512 and the tape pin 510 direct the tape over the tape head 430.

There are many advantages to forming a tape path that has two layers formed at the tape head receiving region 25 of the tape cartridge 10. One advantage is that having two levels or layers of tape 450 for the tape head 430 to contact allows a lower tape tension to be used for a given head and tape interface. In other words, if two layers of tape are presented at the tape head 430, the contact pressure across the head can be higher than when a single layer of tape is presented to the tape head 430. When thinner tape 450 is used, the tension can be lowered so side step many of the ill effects of over stressing the tape and the pressure at the tape head 430 can be kept at a level where the tape 450 will fly at a height to produce good signals when writing to or reading from the tape 450. Using lower tension also requires less torque for the drive motor of the tape drive 400. In addition, lower tension lowers the load on the tape guides 501, 502, 503 and 504 which do not carry multiple layers of tape. For example, in the tape cartridge 10 shown in FIG. 5, the force on tape guide 504 is reduced. On the tape cartridge 10 shown in FIG. 6, the force on each of the tape guides 501 and 502, as well as on tape pins 510 and 512 is also reduced. On the tape cartridge 10 shown in FIG. 7, the force on each of the tape guides 502, 503 and 504 is reduced. Edge loading on the tape is also reduced in tape drives and tape cartridges suing compliant or spring loaded guides since the load is being shared by two or more layers of tape. This helps reduce tape edge damage, distortion, rippling and debris generation.

Lower tension also reduces tape telescoping and also reduces tape creep by lowering stressing in the stored tape.

Other advantages stem from the fact that the length of the tape path is increased. By increasing the effective tape path length and providing layer to layer damping, the closed loop track following servo performance is enhanced. When a hub moves up or down with respect to the base or when the axis of rotation is not coaxial with the hub or when unwrapping a tape having stagger lines, the dampening between the layers slows the movement between the two layers of tape. Eliminating such rapid movement in the direction perpendicular to the length of the tape improves tape tracking. Improved tape tracking enables higher track densities on the tape. Yet another advantage is that thinner tape can now be used. The increased track densities and thinner tape will allow for larger data capacities for a tape cartridge of a particular form factor.

Many of the advantages stated above do not require a tape path 452 that includes two layers or levels of tape 450 presented at the tape head receiving area 25 of the tape cartridge 10. FIG. 7 shows a top view of the base 12 of a tape cartridge 10 and a third magnetic tape path 452 within the tape cartridge 10. In this particular embodiment, there is a double loop 753 associated with the hub 200 and another double loop 755 associate with the hub 300. At the head receiving opening 25 there is a single layer of tape rather than a double layer of tape 450. The tape path 452 begins at the hub 200 and passes over the tape guide 503, around the hub 200 a second time and then around the tape guide 503 a second time. Then the tape passes to the tape guide 502, the tape pin 512, the tape pin 510, and the tape guide 501. The tape path continues to the hub 300 where it forms an outside layer. The tape path 452 passes over the tape guide 504 and then to then to the hub 300 and over the tape guide 504 and to the hub 300 where it is wound onto the hub 300.

The portion of the tape 450 beginning at the hub 200 and passing over the tape guide 503 and then back to the hub 200 is the inner layer 756 of tape 450 forming the double loop 753. The portion of the tape 450 that passes from the hub 200 and over the tape guide 503 the second time is the outside layer 754 of tape 450 forming the double loop 753. In addition, the double looped portion 753 includes the inside layer 766 and the outside layer 764 that passes over the tape guide 503.

The portion of the tape 450 ending at the hub 300 and passing over the tape guide 504 and then back to the hub 300 is the inner layer 766 of tape 450 forming the double loop 755. The portion of the tape 450 that passes from the hub 300 and over the tape guide 504 the second time is the outside layer 764 of tape 450 forming the double loop 755. In addition, the double looped portion 755 includes the inside layer 758 and the outside layer 759 that passes over the tape guide 504.

The tape paths 452 discussed above have all been within a tape cartridge 10. Some tape paths include a single hub. The end of the tape is retrieved and threaded through a tape drive 400. In these instances, the tape path is within the drive 400. It should be noted that a tape drive 400 could also include a multiple layers of tape at various points in the tape path.

Figure 9:
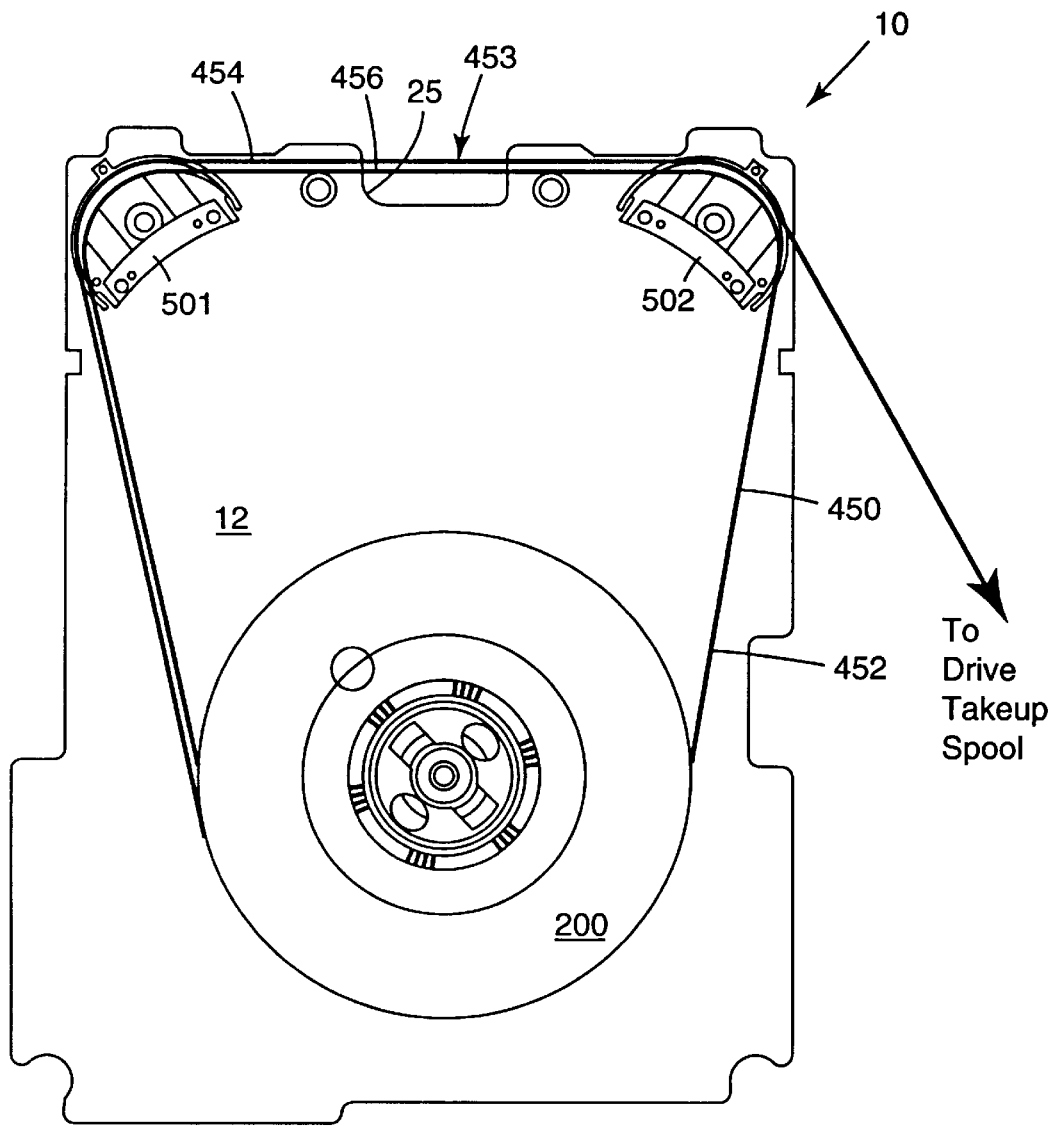
FIG. 9 shows a top view of the base of a tape cartridge and a fourth magnetic tape path within the tape cartridge.

It is also contemplated that a tape cartridge 10 with a single hub could also include a tape path that has multiple layers at the tape receiving portion 25 of the tape cartridge 10 or at one or more of the tape guides or pins. FIG. 9 shows a schematic of tape cartridge 10 which has a single hub 200 and a tape path 452 with multiple layers presented at the tape head receiving portion 25. The tape is wound onto hub 200. From the hub 200 it passes over a first guide 501 and wraps around a second tape guide 502 and back to the hub 200. From the hub 200, the tape 450 goes back to the tape guide 501 and to tape guide 502, and then to the drive take-up reel (not shown). The tape forms a double layer 453 in the area of the tape receiving portion 25. There is an inner layer of tape 456 and an outer layer of tape 454 associated with the double layer 453.

One concern has been raised regarding writing information onto the level of tape nearest the tape head when there are two levels of tape presented to the tape head 430, as is shown in the tape paths in FIGS. 4–6 above. The concern is that the magnetic flux produced by the writing operation may pass through the outer layer 454 of tape 450 and to the inner layer 456 of tape during a write operation. The result would be overwriting the inner layer 456 of tape 450. Currently, it is felt that the magnitude of the magnetic field at the inner layer 456 of tape is not sufficient to produce overwriting onto inner layer of tape 456. In other words, currently this concern is not a problem but in the event a design required a high magnetic write flux, a simple solution is set forth here. Older tape drives may have been designed to produce magnetic field at the write head which is strong enough to cause a write through problem on a thinner tape using one of the tape paths 452 discussed above. In other words, the solution may be necessary to allow downward compatability of tape cartridges with multiple layer portions of tape for use in drives designed for single layer tape cartridges.

Figure 8:
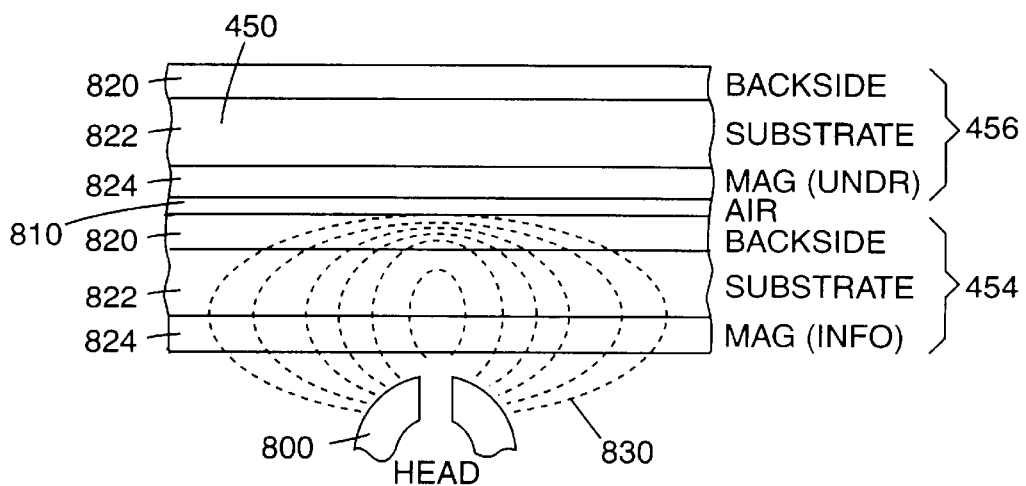
FIG. 8 shows a schematic view of a the magnetic tape and head interface.

FIG. 8 shows a schematic view of a the magnetic tape 450 and magnetic head 800 interface. FIG. 8 shows the outer layer of tape 454 and the inner layer of tape 456 of a double loop of tape 450. Also shown is an air bearing 810 formed between the outer layer of tape 454 and the inner layer of tape 456. Each layer of tape 454 and 456 includes a backside 820, a substrate 822, and a magnetic layer 824. The backside 820 of the tape is provided with a magnetic shield as a preventative measure. The backside pigment would include a predominately soft ferromagnetic particles, such as magnetite, to produce the magnetic shielding. As a result, the lines of flux 830 produced at the gap of the transducer 800 in the head would pass into the tape 450 as usual during the write operation. Rather than passing through the substrate 822 of the outer layer of tape 454 during a write operation, the lines of flux would take the path of least magnetic resistance and pass through the backside 820 of the tape which acts as a magnetic shield. This would occur until the material of the backside 820 of the tape 450 became magnetically saturated. This would prevent overwriting to the inner layer 456 of tape 450.

When using a tape path 452 which includes a double loop 453 of tape 450, the startup procedure for tape drive 400 may have to be modified to assure proper startup. Essentially the hubs 200 and 300 of the tape cartridge 10 must be driven so that the layer of tape 450 underneath the other layer of tape is initially placed in tension. The step of driving the hubs 200 and 300 of the tape cartridge 10 so that the layer of tape underneath the other layer of tape is initially placed in tension must be done for a selected amount of time. The selected amount of time allows an air bearing to be formed between the layers of tape. Tape drives 400 are capable of driving the tape 450 in two directions. In one direction, the layer of tape underneath the other layer of tape is initially placed in tension. When driving the tape in the other direction at start up, the layer of tape underneath the other layer of tape must initially be driven so that the layer of tape underneath the other layer is placed in tension and then the driven direction must be reversed. In other words, the tape must always be started in the same direction within the tape cartridge so that the layer of tape underneath the other layer is placed in tension. The start up procedure for driving the tape in the opposite direction must begin with driving the tape in the direction where the layer of tape underneath the other layer is placed in tension for a short time. This is followed by reversing the tape to the desired direction of travel. It has been found that this procedure is necessary when the tape path 452 includes a tape pin 510 or 512, or a guide 501, 502, 503, or 504 over which the tape changes direction above a certain range. The amount of direction change is typically defined by an angle θ. If the angle θ is more than about 140° to 180° then this startup procedure is necessary to prevent binding between the layers of tape in the tape path 452.

What is claimed is:

1. A tape cartridge comprising:

a first rotatable hub;

a second rotatable hub;

a tape head receiving region; and a flexible recording tape wound upon the first rotatable hub and the second rotatable hub, the flexible recording tape routed through the cartridge to provide first and second levels of tape disposed one behind the other in close proximity to the tape head receiving region of the cartridge such that the first level of tape is disposed adjacent the tape head receiving region and the second level of tape is disposed behind the first level of tape on a side of the first level of tape opposite the tape head receiving region, whereby the first and second levels of tape are capable of providing a higher contact pressure at a tape head due to added support provided by the second level of tape.

2. The cartridge of claim 1, further comprising:

a first guide positioned near the tape head receiving region; and a second guide positioned near the tape head receiving region.

3. The cartridge of claim 2, wherein the flexible tape is routed through the cartridge to provide the first and second levels of tape at at least one of the first guide positioned near the tape head receiving region and the second guide positioned near the tape head receiving region.

4. The cartridge of claim 2, wherein the flexible tape is routed through the cartridge to provide the first and second levels of tape at both the first and the second guides.

5. The cartridge of claim 1, wherein one end of the flexible recording tape is attached to the first rotatable hub.

6. The cartridge of claim 5, wherein the other end of the flexible recording tape is attached to the second rotatable hub.

7. The cartridge of claim 1, further comprising a tape further comprising:

a substrate;

a magnetic layer applied to one side of the substrate; and a backside of soft magnetic material applied to the other side of the substrate.

8. The cartridge of claim 7, wherein the backside of the tape further comprises particles of magnetite.

9. A tape cartridge comprising:

a base;

a first rotatable hub attached to the base;

a second rotatable hub attached to the base;

a tape head receiving region;

a first tape guide attached to the base; and a flexible recording tape wound upon the first rotatable hub and the second rotatable hub, the flexible recording tape routed through the cartridge to provide first and second layers of tape disposed one behind the other and both passing over the first tape guide such that the first layer of tape is disposed adjacent the first tape guide and the second layer of tape is disposed behind the first layer of tape on a side of the first layer of tape opposite the first tape guide, whereby the first and second layers of tape are capable of providing a higher contact pressure at a tape head due to added support provided by the first layer of tape.

10. The cartridge of claim 9, further comprising a second tape guide attached to the base, the flexible recording tape wound upon the first rotatable hub and the second rotatable hub, the flexible recording tape routed through the cartridge to provide the first and second layers of tape at the second tape guide.

11. The cartridge of claim 9, further comprising:

a second tape guide attached to the base; and a shell attached to the base, the shell and base forming an opening for receiving a tape head, the flexible recording tape wound upon the first rotatable hub and the second rotatable hub, the flexible recording tape routed through the cartridge to provide the first and second layers of tape at the second tape guide and at the opening for receiving a tape head.

12. The cartridge of claim 11, further comprising a third tape guide attached to the base, the flexible recording tape routed through the cartridge to provide the first and second layers of tape at the third tape guide.

13. A tape cartridge comprising:

a base;

a first rotatable hub attached to the base;

a second rotatable hub attached to the base;

a tape head receiving region;

a first tape guide attached to the base; and a flexible recording tape wound upon the first rotatable hub and the second rotatable hub, the flexible recording tape routed through the cartridge to provide first and second layers of tape disposed one behind the other and both passing over the first tape guide such that the first layer of tape is disposed adjacent the first tape guide and the second layer of tape is disposed behind the first layer of tape on a side of the first layer of tape opposite the first tape guide, wherein the tape includes:

a substrate, a magnetic layer applied to one side of the substrate, and a backside of soft magnetic material applied to the other side of the substrate.

14. The cartridge of claim 13, wherein the backside of the tape further comprises particles of magnetite.

15. A tape cartridge comprising:

a base;

at least one rotatable hub attached to the base;

a shell attached to the base and forming an enclosure, the shell and base including a tape head receiving region; and a flexible recording tape wound upon the rotatable hub, the flexible recording tape routed such that the tape presents first and second layers of tape disposed one behind the other in close proximity at the tape head receiving region such that the first layer of tape is disposed adjacent the tape head receiving region and the second layer of tape is disposed behind the first layer of tape on a side of the first layer of tape opposite the tape head receiving region, whereby the first and second layers of tape are capable of providing a higher contact pressure at a tape head due to added support provided by the second layer of tape.

16. The cartridge of claim 15, further comprising:

a first guide positioned near the tape head receiving region; and a second guide positioned near the tape head receiving region.

17. The cartridge of claim 16, wherein the flexible tape is routed through the cartridge to provide the first and second layers of tape at one of the first and the, second guides.

18. The cartridge of claim 16, wherein the flexible tape is routed through the cartridge to provide the first and second layers of tape at both the first guide and the second guide.

19. A tape cartridge comprising:

a base;

a first rotatable hub attached to the base;

a second rotatable hub attached to the base;

a tape head receiving region;

a first tape guide attached to the base; and a flexible recording tape wound upon the first rotatable hub and the second rotatable hub, the flexible recording tape routed through the cartridge to provide first and second levels of tape disposed one behind the other in close proximity at at least one of the first tape guide or the tape head receiving region such that the first level of tape is disposed adjacent the tape head receiving region and the second level of tape is disposed behind the first level of tape on a side of the first level of tape opposite the tape head receiving region, whereby the first and second levels of tape are capable of providing a higher contact pressure at the tape head due to added support provided by the second level of tape.

20. The cartridge of claim 19, wherein the flexible recording tape further comprises:

a substrate;

a magnetic layer applied to one side of the substrate; and a backside of soft magnetic material applied to the other side of the substrate.

21. The cartridge of claim 20, further comprising a shell attached to the base, the shell and base forming an opening for receiving a tape head.

* * * * *